(12) United States Patent
Pu et al.

(10) Patent No.: US 9,980,313 B2
(45) Date of Patent: May 22, 2018

(54) RADIO COMMUNICATION DEVICE AND METHOD FOR OPERATION THEREOF

(71) Applicant: Intel IP Corporation, Santa Clara, CA (US)

(72) Inventors: Tian Yan Pu, Dresden (DE); Christian Drewes, Germering (DE)

(73) Assignee: Intel IP Corporation, Santa Clara, CA (US)

( * ) Notice: Subject to any disclaimer, the term of this patent is extended or adjusted under 35 U.S.C. 154(b) by 36 days.

(21) Appl. No.: 14/571,414

(22) Filed: Dec. 16, 2014

(65) Prior Publication Data

US 2016/0174289 A1    Jun. 16, 2016

(51) Int. Cl.
| | |
|---|---|
| *H04W 76/04* | (2009.01) |
| *H04W 24/08* | (2009.01) |
| *H04W 88/02* | (2009.01) |
| *H04W 72/12* | (2009.01) |
| *H04W 52/02* | (2009.01) |

(52) U.S. Cl.
CPC ......... *H04W 76/048* (2013.01); *H04W 24/08* (2013.01); *H04W 52/029* (2013.01); *H04W 72/1278* (2013.01); *H04W 88/02* (2013.01); *Y02B 60/50* (2013.01)

(58) Field of Classification Search
CPC ........... H04W 72/1278; H04W 76/048; H04W 24/08; H04W 52/029; H04W 88/02; Y02B 60/50
See application file for complete search history.

(56) References Cited

U.S. PATENT DOCUMENTS

| | | | |
|---|---|---|---|
| 2009/0285116 A1* | 11/2009 | Nanda | H04W 72/02 370/252 |
| 2012/0044822 A1* | 2/2012 | Kim | H04W 24/10 370/252 |
| 2013/0095829 A1 | 4/2013 | Bhattad et al. | |
| 2013/0111241 A1 | 5/2013 | Ha et al. | |
| 2013/0176873 A1 | 7/2013 | Ji et al. | |
| 2013/0229931 A1* | 9/2013 | Kim | H04W 24/10 370/252 |
| 2014/0348020 A1* | 11/2014 | Tenny | H04W 68/00 370/252 |

(Continued)

OTHER PUBLICATIONS

Extended European Search Report issued in the corresponding EP application No. 15194833.8 dated May 10, 2016 (9 pages).

*Primary Examiner* — Junpeng Chen
(74) *Attorney, Agent, or Firm* — Viering, Jentschura & Partner MBB

(57) ABSTRACT

A mobile communications device is described including a wireless transceiver, a radio resource control (RRC) circuit connected to the transceiver, the RRC circuit including at least one timer configured to measure at least one mode trigger, a mode selector responsive to said timer, the mode selector configured to transition among a plurality of support modes, each of the support modes corresponding to at least one task, wherein each of the tasks is associated with a task frequency, a context detection circuit configured to detect at least one context information, a task frequency adaptation circuit configured to adjust at least one of said task frequency to an adjusted task frequency, responsive to the at least one context information.

9 Claims, 2 Drawing Sheets

(56) References Cited

U.S. PATENT DOCUMENTS

| | | | |
|---|---|---|---|
| 2014/0378084 A1* | 12/2014 | Preteseille | H04W 52/0216 455/404.1 |
| 2015/0110005 A1* | 4/2015 | Hammer | H04W 4/10 370/329 |
| 2016/0150475 A1* | 5/2016 | Rune | H04W 76/04 370/311 |

* cited by examiner

RADIO COMMUNICATION DEVICE AND METHOD FOR OPERATION THEREOF

TECHNICAL FIELD

Embodiments described herein generally relate to radio communication devices and methods for resource control.

BACKGROUND

A radio communication device such as a smart phone continues to draw battery power even after the termination of a phone call, web surfing, or media viewing. A standby mode is entered either by the end user or automatically by power control systems on the device. In standby mode, the wireless cellular modem inside the device may enter a radio resource control idle (RRC_IDLE) mode which continues discontinuous reception (DRX) of limited information from serving cell such as paging channel, message or system information acquisition, or may periodically undertake neighbor cell search/measurement (CS&M) for cell reselection to support mobility in the idle mode. Detailed control of resource utilization, including battery power is desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
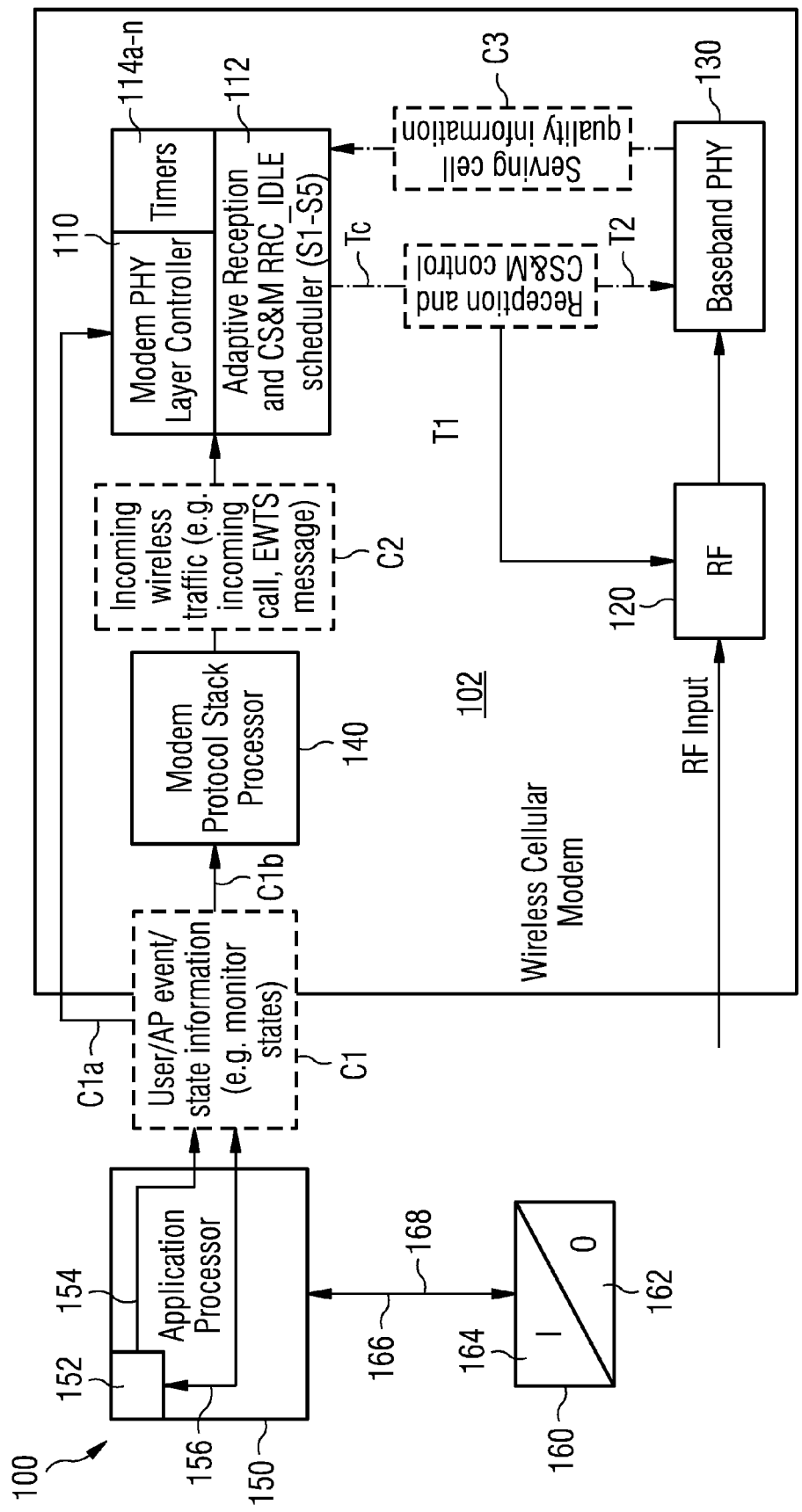
FIG. 1 shows a radio communication device.

An exemplary mobile communications device 100 is shown in FIG. 1. Mobile communications device 100 includes wireless cellular modem 102 having physical (PHY) layer modem controller 110 configured to receive context information, illustrated as C1, C2, C3 in FIG. 1. Modem controller 110 includes an adaptive scheduler circuit 112 configured to schedule at least one task within at least one operational mode, which may be an idle mode, responsive to any of context information C1-C3. Mobile communications device 100 also includes radio frequency (RF) transceiver 120 configured to receive at least a portion, indicated as T1, of task control information Tc from adaptive scheduler circuit 112.

Context information C1-C3 includes information, such as in the form of data related to the manner and/or the environment in which mobile communications device 100 is being used and/or the state of a user in connection with the device. Context information may include any information such as user event information, access point (AP) information, monitor state information, incoming wireless traffic information, and serving cell quality information.

Incoming wireless traffic information C2, for example, may include data related to incoming call information, incoming message information and incoming emergency message information.

Mobile communications device 100 may include a PHY layer baseband processor 130 connected to RF transceiver 120. Baseband processor 130 may be configured to receive at least a portion, indicated as T2 of task control information Tc from adaptive scheduler circuit 112.

Task control information Tc is generally information related to the scheduling of a task in mobile communications device 100. For example, tasks may include reception control tasks including dis-continuous reception (DRX) of information from serving cell such as paging channel messages or system information acquisition. Further examples of tasks having related task control information Tc include neighbor cell search/selection/measurement (CS&M) information. However tasks may include any processing, including routine processing carried out by mobile communications device 100, such as any task that consumes power upon execution, including battery power or supply power external to mobile communications device 100.

Mobile communications device 100 may also include an application processor 150 which may be configured as a general purpose processor, or central processor to mobile communications device 100. Application processor 150 may also be advantageously configured to provide context information, such as context information C1a, to modem controller 110.

According to aspects of the disclosure, context information C1 provided by the application processor includes data including least one of display state information, application software state information, application processor power state information, activity time information, network connectivity information and event information.

According to further exemplary aspects, mobile communications device 100 may include a modem protocol stack processor 140, which may be connected between application processor 150 and modem controller 110, modem protocol stack processor 140 configured to provide context information C2, which may include incoming wireless traffic information, to modem controller 110.

Mobile communications device 100 may be a cellular telephone, smartphone, cellular-connected tablet or laptop computer, or may be any cellular communications enabled device. As such, RF transceiver 120 may be advantageously configured to operate on a mobile radio communication network. More particularly, the mobile radio communication network may be any cellular network. Still more particularly, the mobile radio communication network may be a Long Term Evolution (LTE) network, still more particularly, the mobile communications device may be configured to operate on a Long Term Evolution Advanced (LTE-A) network.

While operating mobile communications device 100 on a mobile radio communication network, modem controller 110 may operate according to one of a number of operational modes. At least one of these operational modes may be an idle mode, or more specifically an RRC_IDLE mode.

Once a user finishes a phone call, or web surfing, or on-line movie watching, mobile devices are typically put into standby mode either by the user or automatically by power control systems a device such as mobile communications device 100. Automatic changes in operational mode, for example, may involve a timer.

In standby mode, modem controller 110 may be or remain in RRC_IDLE mode. For most users, mobile devices such as mobile communications device 100 may be in standby mode most of the time that the device is nominally powered on. Accordingly, battery life may be highly dependent upon the performance of the device in RRC_IDLE mode.

During RRC_IDLE mode, modem controller 110 may activate in connection with the performance of any of a plurality of tasks. In particular reception control and CS&M are tasks performed from an RRC_IDLE mode according to a periodic schedule, or task frequency indicating, for example, the intervals between performance of a specific task. To fulfill mobility support requirements in RRC_IDLE mode, it may be typical to perform neighbor cell search and measurement at fixed time intervals, such as where serving cell quality is below certain thresholds.

According to an example, in an idle mode, such as RRC_IDLE, paging frequency may be governed according to specific time periods, such as frames. A frame may, for example, have a time period of 10 milliseconds (ms). While in an idle mode, paging frequency may be varied within a predefined set of paging frequencies. An exemplary range may be from a maximum of four times per frame to a minimum of once every 32 frames. Typical increments between the minimum and maximum frequency may be twice per frame, once per frame, once every 2 frames, once every 4 frames, once every 8 frames or once every 16 frames.

Per paging occasion, CS&M may be activated once either for measurement only or search/measurement together. CS&M frequency may therefore be at least partially dependent upon paging frequency, which may also be referred to as DRX frequency. Whether CS&M, in the form of measurement only or search/measurement, takes place during a particular paging occasion may be dependent upon thresholds, such as paging signal strength or quality, or other paging results.

According to aspects of the disclosure, mobile communications device 100 may provide reception control information including data related to the task of discontinuous reception (DRX) of serving cell information from the mobile radio communication network. According to an aspect of the disclosure, a typical task frequency in mobile communications device 100 associated with DRX may be between four times per frame and once per 32 frames, where a frame is 10 ms.

According to a particular aspect of the present disclosure, mobile communications device 100 wherein the serving cell information or serving cell quality information is limited to one or more of the group including a paging channel, message and/or system information acquisition.

According to a further aspect of the disclosure, a task may include cell search and measurement (CS&M) of neighbor cells of the mobile radio communication network. For example, a task frequency associated with CS&M may typically be as high as four times per frame, and may be activated once either for measurement only or search and measurement together. The task frequency associated with CS&M may be at least partially based on a measurement of serving cell quality. Additionally, the task frequency associated with CS&M may be at least partially based on a threshold for serving sell quality. Still further, whether CS&M involves measurement only or search/measurement together may be determined at least in part on context information, with lower power consuming actions being emphasized when context suggests mobile connectivity is less likely to be needed.

Thresholds, such as for serving cell quality may be provided by the mobile radio communications network. It may be, in such cases, that the thresholds are provided by the network without consideration of context information, such as context information based on user state. Exact time intervals for CS&M are advantageously selected to balance between power consumption due to execution of a task, and mobility performance with certain tradeoffs. For example, intra-frequency measurement may be carried out every DRX cycle during RRC_IDLE mode (which may be triggered, for example, by a period of inactivity of RF transceiver 120) if serving cell quality is below the configured threshold. Such a fixed interval CS&M scheduling, such as for cell-reselection may still prove to be a sub-optimum approach, where it does not take user state and application of modem or any other context information into consideration.

According to an additional aspect of the disclosure, mobile communications device 100 further includes input/output (I/O) device 160, the input/output device including, for example an output device 162 such as a display screen for providing output data 166 to a user, or the user's environment. I/O device 160 may be connected to application processor 150. An input device 164, such as a keyboard, or touch screen superposed over the display screen may provide input data 168 from a user or the user's environment.

Output and/or input data 166/168 may contain context information in the form of display state information, or user state information such as activity level, or specific usage details. Alternative input or output devices may include motion sensors, audio transducers, light sources, charge-coupled devices and/or temperature sensors. Context information derived from data streams 166 and/or 168 may include data volume as a generic indicator of user activity level, or specific data types which may be associated with different types or levels of user/application/event activity.

1) Context Information Derived from Display State

According to a first specific and exemplary aspect of the current disclosure, adaptive scheduler circuit 112 may interrogate at least one of the input and/or output data, either directly or through another component of mobile communications device 100, such as via application processor 150 or via one or both of modem protocol stack processor 140 and application processor 150. The interrogation of the I/O is for the purpose of detecting and/or deriving context information from the I/O data streams 166/168 such as to determine or to detect display state information.

When a user puts mobile communications device 100 into a locked configuration, such as with the display locked, it may be sub-optimal to continue to execute radio communication tasks according to a schedule or task frequency that may have been used when the display I/O 160 was actively in use by the user. For example, mobile communications device 100 may be in RRC_IDLE mode due to inactivity of the cell network link whether or not display I/O is actively being used. Tailoring the scheduling of tasks to context information obtained such as from display I/O may be advantageous such as where, as on a tablet, there is typically a reduced need for mobility support when a display is idle, or locked.

By way of example, it may be that whenever display 160 of mobile communications device 100 is locked, only a minimum mobility support may be needed, provided link quality of the serving cell C3 is still good enough to receive paging channel and message service. In case modem controller 110 is used in a tablet, mobility support may theoretically be further relaxed when display 160 is locked since it may be that modem controller 110 is not used to receive incoming calls in this state. Then, when display 160 is unlocked, modem controller may signal switching to good mobility support (for example while remaining in RRC_IDLE mode) by scheduling more frequent CS&M activities through adaptive scheduler 112. Moreover during unlocking of display 160, a particularly fast neighbor CS&M acquisition may advantageously be activated to keep neighbor cell information updated.

Accordingly, according to an aspect of the disclosure, at least one of task control information Tc is adjusted responsive to said display state information. Further, input/output device 160 may include a user- or automatically-lockable display.

More particularly, adaptive scheduler circuit 112 may adjust at least part of task control information Tc to adjust at least one task frequency associated with the RF transceiver downward in response to a locked display 160. Likewise, and by further example, adaptive scheduler circuit 112 may adjust, such as via task control information Tc, at least one task frequency upward in response to an unlocking of a locked display 160.

According to this aspect of the disclosure, at least one of the task frequencies may be a DRX task frequency.

Further according to this aspect of the disclosure, the DRX task frequency may be adjusted to between four times per frame (for example, where a frame is 10 ms) and once every 32 frames, in response to a locked display 160. More specifically, where a locked display is an indication of a reduced mobility support requirement, the task frequency may be reduced to twice per frame, once per frame, once every 2 frames, once every 4 frames, once every 8 frames, once every 16 frames or once every 32 frames, with the lower frequencies being associated with progressively lower mobility support in the device.

Further according to this aspect of the disclosure, the DRX task frequency may be adjusted to between four times per frame and once every 32 frames, in response to unlocking a locked display 160. More specifically, where an unlocked display is an indication of an increased mobility support requirement, the task frequency may be increased at once or progressively to once per 16 frames, once per 8 frames, once per 4 frames, once per 2 frames, once per frame, twice per frame or for example four times per frame with the higher frequencies being associated with progressively higher mobility support in the device.

Further according to this aspect of the disclosure, at least one of the task frequencies may be a CS&M task frequency.

Further according to this aspect of the disclosure, the CS&M task frequency may be adjusted to between four times per frame and once per 32 frames in response to a locked display 160. Moreover, the task frequency of CS&M may be dependent upon the DRX task frequency, or be a multiple or fraction thereof.

Further according to this aspect of the disclosure, the CS&M task frequency is adjusted to between four times per frame and once per 32 frames in response to the unlocking of the locked display 160. Moreover, the task frequency of CS&M may be dependent upon the DRX task frequency, or be a multiple or fraction thereof.

2) Context Information Derived from Application Software State

Once application software, for example software such as web browsers or offline email synchronization, that requires wireless data, such as via a wireless data pipe, is activated, the likelihood of a need for wireless access is relatively high. In such an event, it may be advantageous for modem controller 110, such as via adaptive scheduler circuit 112, to signal increased mobile connectivity by adjusting task frequencies to a fast track. By contrast, if no application software requiring wireless data, or access to a wireless data pipe is activated, modem controller 110 may signal a rest-state or rest mode so that power consumption can be minimized.

Accordingly, mobile communications device 100 may further include a software application 152 configured to be executed on application processor 150. Advantageously, adaptive scheduler circuit 112 interrogates the processor to detect an application execution state information 154, whereupon adaptive scheduling circuit 112 derives at least one context information from application execution state information 154.

Further, according to this aspect of the disclosure, at least one task frequency associated with task control information Tc is adjusted responsive execution state information 154 of software application 152.

Further, according to this aspect of the disclosure, software application 152 requires a wireless data pipe 156.

Further, according to this aspect of the disclosure, adaptive scheduler circuit 112 adjusts at least one task frequency downward in response to a change in the application execution state 154 of software application 152.

Further, according to this aspect of the disclosure, at least one task frequency is adjusted upward, such as by adaptive scheduler circuit 112 via task control information Tc, in response to an exchange of data across wireless data pipe 156.

Further, according to this aspect of the disclosure, the at least one task frequency is a DRX task frequency.

Further, according to this aspect of the disclosure, and as described in detail above, the DRX task frequency may be adjusted to between four times per frame and once per 32 frames in response to the activation of software application 152.

Further, according to this aspect of the disclosure, the DRX task frequency may be adjusted to between four times per frame and once per 32 frames in response to an exchange of data across wireless data pipe 156.

Further, according to this aspect of the disclosure, at least one task frequency is a CS&M task frequency.

Further, according to this aspect of the disclosure, the CS&M task frequency is adjusted to between four times per frame and once per 32 frames in response to activation of software application 152.

Further, according to this aspect of the disclosure, the CS&M task frequency is adjusted to between four times per frame and once per 32 frames in response to an exchange of data across wireless data pipe 156.

As with context information derived from display state discussed above, task frequencies may be at once or progressively adjusted. Typically, higher frequencies are associated with increased mobile support, and lower frequencies are associated with decreases in mobile support. Also typically, power/battery consumption is inversely proportional to task frequency.

3) Based on Application Processor Power States

Processors such as application processor 150 often have native processor power states that throttle power consumption depending on the activity level of the processor. For example, different activity states might follow ACPI or comparable specifications. Context information relevant to adaptive scheduler 112 may be derivable from power state information.

Therefore, according to this aspect of the disclosure, application processor 150 is configured to selectively enter one of a plurality of power states including at least one high power state and one low power state.

Further, according to this aspect of the disclosure, the power states may be controlled according to Advanced Configuration and Power Interface (ACPI) specifications.

Further, according to this aspect of the disclosure, at least one task frequency is adjusted, such as by adaptive scheduler circuit 112 via task control information TC, responsive to the power states of application processor 150.

Further, according to this aspect of the disclosure, the power state is determined independently of the RRC circuit. In other words, application processor 150 may implement multiple power states, and change from one state to another independent of the rules governing the RRC_IDLE mode, or any other RRC mode that mobile communications device 100 may enter.

Further, according to this aspect of the disclosure, adaptive scheduler circuit 112 may adjust at least one task frequency downward in response to a change in power states of application processor 150.

Further, according to this aspect of the disclosure, adaptive scheduler circuit 112 may adjust at least one task frequency upward in response to a change in power states of application processor 150.

Further, according to this aspect of the disclosure, at least one task frequencies is a DRX task frequency.

Further, according to this aspect of the disclosure, the DRX task frequency is adjusted to between four times per frame and once per 32 frames in response to application processor 150 entering a low power state from a high power state.

Further, according to this aspect of the disclosure, the DRX task frequency is adjusted to between four times per frame and once per 32 frames in response to application processor 150 entering the high power state from said low power state.

Further, according to this aspect of the disclosure, at least one task frequency is a CS&M task frequency.

Further, according to this aspect of the disclosure, the CS&M task frequency is adjusted to between four times per frame and once per 32 frames in response to application processor 150 entering the low power state from said high power state.

Further, according to this aspect of the disclosure, the CS&M task frequency is adjusted to between four times per frame and once per 32 frames in response to application processor 150 entering the high power state from said low power state.

As with context information derived from display or application state discussed above, task frequencies may be at once or progressively adjusted. Typically, higher frequencies are associated with increased mobile support, and lower frequencies are associated with decreases in mobile support. Also typically, power/battery consumption is inversely proportional to task frequency.

4) Based on Last Activity Time

In case of mobile communications device 100 has been in idle mode, such as RRC_IDLE for an extended period of time, mobility requirements (as expressed in CS&M or DRX task frequency) can be relaxed in contrast to a situation where there has been recent wireless traffic. In particular, this applies to CS&M following a similar logic to DRX inactivity timers, but with potentially longer timers in the case of CS&M.

Therefore, according to this aspect of the disclosure, mobile communications device 100 further includes a number 'n' of timers 114*a, b, c* . . . through 114*n* (shown as 114*a-n*) configured to measure a delay. In this aspect, adaptive scheduling circuit 112 is configured to delay task frequency adjustment according to the delay measured by at least one of timers 114.

According to this aspect of the disclosure, mobile communications device 100 may further include a second timer (e.g. 114*b*) configured to measure a time period during which mobile communications device 100 remains in one operational mode, such as RRC_IDLE mode.

Further, according to this aspect of the disclosure, at least one task frequency may be adjusted responsive to second timer 114*b*.

Further, according to this aspect of the disclosure, adaptive scheduler circuit 112 adjusts at least one task frequency downward when second timer 114*b* exceeds a threshold.

Further, according to this aspect of the disclosure, the threshold may be set between 1 microsecond and several minutes.

Further, according to this aspect of the disclosure, at least one task frequency is a DRX task frequency.

Further, according to this aspect of the disclosure, the DRX task frequency is adjusted such as via the adaptive scheduling circuit 112 to between four times per frame and once per 32 frames where a frame is 10 milliseconds in response to exceeding the threshold.

Further, according to this aspect of the disclosure, at least one task frequency is a CS&M task frequency.

Further, according to this aspect of the disclosure, adaptive scheduling circuit 112 adjusts the CS&M task frequency downward when the second timer exceeds a threshold.

Further, according to this aspect of the disclosure, the CS&M task frequency is adjusted to between four times per frame and once per 32 frames where a frame is 10 milliseconds in response to exceeding the threshold exceeded by the second timer.

5) Based on VPN Connectivity

In case mobile communications device 100 is a corporate device, such as a device routinely connected to a virtual private network (VPN), lower power requirements may be inferred from connectivity to the VPN as cellular connection may be restricted during such connectivity. For example, CS&M tasks by be reduced to save power under those less stringent requirements for mobile connectivity. VPN initiation and emergency services might still be required, prohibiting a complete shut-off of cellular service. Those rare events could actually trigger a 'fast acquisition mode' with improved performance at the cost of instantaneous power consumption, but still enabling an overall improved average power consumption.

Therefore, according to this aspect of the disclosure, operation of mobile communications device 100 on the mobile radio communication network may be restricted during data connectivity to a virtual private network (VPN). Therefore, at least one task frequency may be adjusted by adaptive scheduler circuit 112 responsive to VPN data connectivity.

Further, according to this aspect of the disclosure, adaptive scheduler circuit 112 is configured to adjust at least one of said task frequencies downward in response to connection to the VPN.

Further, according to this aspect of the disclosure, at least one task frequency is adjusted upward via adaptive scheduler circuit 112 in response to disconnection from the VPN.

Further, according to this aspect of the disclosure, at least one task frequency is adjusted upward in the event that an emergency communication is required.

Further, according to this aspect of the disclosure, at least one task frequency is a DRX task frequency.

Further, according to this aspect of the disclosure, the DRX task frequency is adjusted to between four times per frame and once per 32 frames in response to connection to the VPN.

Further, according to this aspect of the disclosure, the DRX task frequency is adjusted to between four times per frame and once per 32 frames in response to disconnection from the VPN.

Further, according to this aspect of the disclosure, at least one task frequency is a CS&M task frequency.

Further, according to this aspect of the disclosure, the CS&M task frequency is adjusted to between four times per frame and once per 32 frames in response to connection to the VPN.

Further, according to this aspect of the disclosure, the CS&M task frequency is adjusted to between four times per frame and once per 32 frames in response to disconnection from the VPN.

Still further, according to this aspect of the disclosure, the CS&M task frequency is the same as a CS&M task frequency associated with the RRC_IDLE operational mode.

RRC_IDLE Implementation

Figure 2:
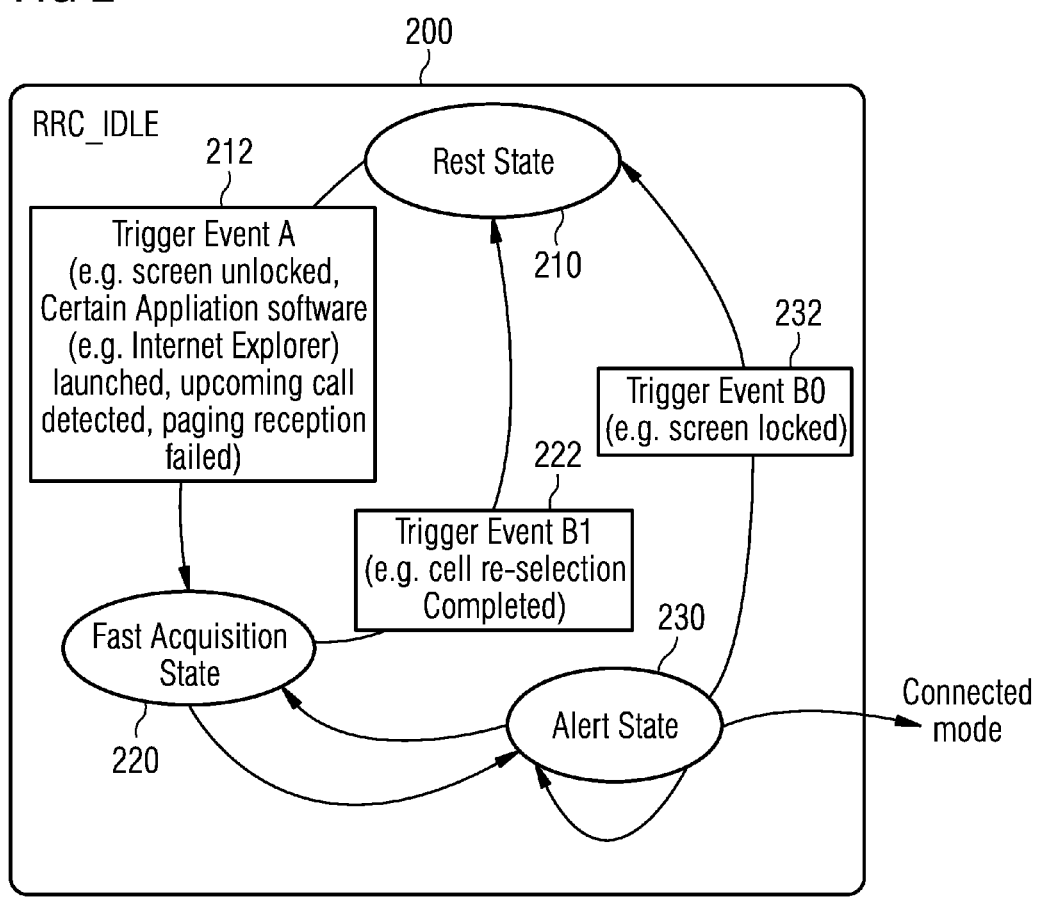
FIG. 2 shows a flow diagram illustrating a method for operating the communication device.

An exemplary implementation in support of the device and method of the present disclosure is shown in FIG. 2. More particularly, FIG. 2 discloses the functional state definition and state transition inside adaptive scheduler 112. Based on monitoring context information including, for example, user state information, link quality of serving cell, different mobility support levels are provided in the respective states.

Rest State 210: In this state, medium to low performance for RRC_IDLE mobility support is provided. To reduce power consumption further, reception of paging channel may also be set to a lower task frequency (e.g. not every customary DRX cycle wakes modem controller 110 to receive data from serving cell). Modem controller 110 should exit from this state if a trigger event, such as trigger event A (212) is detected. Included in trigger event A could be screen 160 being unlocked, or an event from application processor 150, such as a change in processor state, or detection of an upcoming call event from protocol stack processor 140, or a link warning/failure from baseband processor 130. Modem controller may return to rest state 210 of trigger event B, such B1 (222) is detected. Included in trigger event B could be a screen lock event, or cell reselection completion event while screen is still locked, and no upcoming call is detected.

Fast Acquisition State 220: In this state, modem controller 110 should initiate performance of CS&M at a relatively high task frequency in order to keep the cell database updated and provide input for fast cell reselection if needed. The dwell time in this state may be measured in seconds. For example, assuming user takes one or more seconds to unlock mobile communications device 100, such as by sliding a finger and/or entering a passcode, modem controller 110 may have sufficient time to signal entry into fast acquisition state 220 and to react accordingly, if notified, for example, by application processor 150. Based on such an event notification, CS&M engine (e.g. baseband processor 130 and/or RF transceiver 120) shifts operation to fast acquisition state 220, increasing relevant task frequencies significantly. Ping-pong reselection due to hysteresis and maladjustment of offset threshold used for re-selection should be avoided. Modem controller 110 may signal an exit from state 220, for example once the cell database is updated.

Alert State 230: CS&M engine should stay alert in this mode, and provide good mobility performance, since the chance for a user to start using wireless data, or a connection to the cellular network is high. In case very good serving cell link quality is detected, CS&M performance could be relaxed. However CS&M update rate should be much higher, and the relevant task frequencies set accordingly, than in rest state 210 in order not to impact user experience.

Accordingly, a method for operating mobile communications device 100 on a mobile radio network is disclosed. The method calls for entering a support mode, such as RRC_IDLE mode, via physical (PHY) layer modem controller 110 of mobile communications device 100, the support mode associated with at least one task, such as DRX and/or CS&M, each of the at least one tasks having a support mode task frequency.

The PHY layer modem controller 100 detects the occurrence of at least one of a plurality of trigger events, such as 212, 222 and 232. Modem controller 110 determines whether the at least one detected trigger event is one of least a first type or a second type. As disclosed in FIG. 1, the first type is a 'B' type (222 (B1) or 232 (B0)), and the second type is an 'A' type (212). Modem controller 110 controls RF transceiver 120 of mobile communications device 100, via adaptive scheduler circuit 112 within the PHY layer modem controller, to perform the at least one of the at least one tasks at a rest-state 210 task frequency if the trigger event is of the first type.

According to a further aspect of the disclosure, mobile communications device 100 is configured to operate on a mobile radio communication network which may be a Long Term Evolution (LTE) network or a Long Term Evolution Advanced (LTE-A) network.

According to a further aspect of the disclosure, the support mode is an RRC_IDLE mode.

According to a further aspect of the disclosure, the rest-state task frequency for any given task may be configured to be lower than the support mode task frequency.

According to a further aspect of the disclosure, RF transceiver 120 is controlled, via adaptive scheduler circuit 112 to perform the at least one of the at least one tasks at a fast acquisition-state 220 task frequency if the trigger event is of the second type.

According to a further aspect of the disclosure, the fast acquisition-state 220 task frequency is configured to be higher than the rest state 210 task frequency.

According to a further aspect of the disclosure, the acquisition-state 220 task frequency is configured to be lower than the support mode (e.g. RRC_IDLE) task frequency.

According to a further aspect of the disclosure, RF transceiver 120 is controlled, via adaptive scheduler circuit 112 to perform the at least one of the at least one tasks at the rest-state 210 task frequency after a period of time at the fast acquisition state 220 task frequency.

According to a further aspect of the disclosure, the period of time until the transition is defined by completion of a cell selection & measurement (CS&M).

According to a further aspect of the disclosure, the period of time is defined by a timer 114.

According to a further aspect of the disclosure, RF transceiver 120 is controlled, via adaptive scheduler circuit 112, to perform the at least one of the at least one tasks at an alert-state 230 task frequency.

According to a further aspect of the disclosure, RF transceiver 120 is controlled, via adaptive scheduler circuit 112, to perform the at least one of the at least one tasks at one of the rest state 210 task frequency or the fast acquisition state 220 task frequency after a period of time.

According to a further aspect of the disclosure, RF transceiver 120 is controlled, via adaptive scheduler circuit 112, to perform the at least one of the at least one tasks at the alert state task frequency 230 until a second trigger event is detected.

According to a further aspect of the disclosure, the second trigger event is of the second type.

According to a further aspect of the disclosure, the RF transceiver 120 is controlled, via adaptive scheduler circuit 112, to perform the at least one of the at least one tasks at the rest state 210 task frequency upon detection of the second trigger event.

According to a further aspect of the disclosure, any one of the group including locking a display screen, a completion of cell reselection, connection to a virtual private network (VPN), a decrease in activity in a processor of the mobile communications device, a reduction in processor power state, an increase in serving cell quality, and reduction in access by an application to a wireless data pipe are defined as trigger events of the first type, and any one of the group including unlocking a display screen, detection of an incoming wireless signal, detection of an incoming emergency message, an increase in application access to a wireless data pipe, a decrease in inactivity in a processor of the mobile communications device, a reduction in a power state of the processor, a decrease in serving cell quality and disconnection from a virtual private network (VPN) are defined as trigger events of the second type.

The following examples pertain to further embodiments. Example 1, as described with reference to the figures discloses a mobile communications device comprising a wireless transceiver, and a controller circuit, which may be a radio resource control (RRC) circuit, connected to the transceiver. The controller circuit of Example 1 comprises at least one timer configured to measure at least one mode trigger, a mode selector configured to transition among a plurality of support modes (which may be in response to the at least one mode trigger), each of the plurality of support modes corresponding to at least one task each associated with a task frequency, a context detection circuit configured to detect at least one context information, and a task frequency adaptation circuit configured to adapt the task frequency to an adjusted task frequency, responsive to detecting, or to the detected, at least one context information.

In Example 2, the subject matter of Example 1 is disclosed wherein the wireless transceiver is configured to operate in a mobile radio communication network.

In Example 3 the subject matter of Example 2 is disclosed wherein the mobile radio communication network is a Long Term Evolution (LTE) network.

In Example 4, the mobile communications device of Example 3 is disclosed wherein the LTE network is a Long Term Evolution Advanced (LTE-A) network.

In Example 5, the mobile communications device of Examples 1-4 is disclosed wherein the plurality of support modes comprises an RRC idle mode.

In Example 6, the mobile communications device of Examples 2-5 is disclosed wherein said at least one task includes discontinuous reception (DRX) of serving cell information from the mobile radio communication network.

In Example 7, the mobile communications device of Example 6 is disclosed wherein the task frequency associated with DRX is between about four times per frame and about once per 32 frames and wherein a frame is about 10 milliseconds.

In Example 8, the mobile communications device of Examples 6-7 is disclosed wherein the serving cell information is limited to one or more of the group including a paging channel, message, system information acquisition or a combination thereof.

In Example 9, the mobile communications device of Examples 2-5 is disclosed wherein said at least one task includes search and measurement (CS&M) of neighbor cells of the mobile radio communication network.

In Example 10, the mobile communications device of Example 9 is disclosed wherein the task frequency associated with CS&M is between about four times per frame and about once per 32 frames where a frame is about 10 milliseconds.

In Example 11, the mobile communications device of Example 10 is disclosed wherein the task frequency associated with CS&M is at least partially based on a measurement of serving cell quality.

In Example 12, the mobile communications device of Example 11 is disclosed wherein the task frequency associated with CS&M is at least partially based on a threshold for serving sell quality.

In Example 13, the mobile communications device of Example 12 is disclosed wherein the threshold for serving cell quality is provided by the mobile radio communications network.

In Example 14, the mobile communications device of Examples 9-13 is disclosed wherein CS&M is configured for cell re-selection.

In Example 15, the mobile communications device of Examples 1-14 is disclosed wherein said mode trigger is a period of inactivity of the wireless transceiver.

In Example 16 the mobile communications device of Example 15 may optionally include an output device for providing output data to a user environment, and an input device for receiving input data from a user environment wherein the output and input data contain context information in the form of display state information.

In Example 17, the mobile communications device of Example 16 is disclosed wherein the context detection circuit interrogates at least one of the input or output data to detect the display state information.

In Example 18, the mobile communications device of Example 17 is disclosed wherein the task frequency is adjusted responsive to said display state information.

In Example 19, the mobile communications device of Example 16 is disclosed wherein the input or output device includes a lockable display.

In Example 20, the mobile communications device of Example 19 is disclosed wherein the task frequency adaptation circuit adjusts the task frequency downward in response to a locked display.

In Example 21, the mobile communications device of Example 20 is disclosed wherein the task frequency is adjusted upward in response to an unlocking of the locked display.

In Example 22, the mobile communications device of Example 21 is disclosed wherein the task frequency is a DRX task frequency.

In Example 23, the mobile communications device of Example 22 is disclosed wherein said DRX task frequency is adjusted to between about four times per frame and about once per 32 frames where a frame is about 10 milliseconds in response to the locked display.

In Example 24, the mobile communications device of Example 22 is disclosed wherein said DRX task frequency is adjusted to between four times per frame and once per 32 frames where a frame is 10 milliseconds in response to the unlocking of the locked display.

In Example 25, the mobile communications device of Example 21 is disclosed wherein the at least one of said task frequencies is a CS&M task frequency.

In Example 26, the mobile communications device of Example 25 is disclosed wherein said CS&M task frequency is adjusted to between about four times per frame and about once per 32 frames wherein a frame is about 10 milliseconds in response to the locked display.

In Example 27, the mobile communications device of Example 26 is disclosed wherein said CS&M task frequency is adjusted to between about four times per frame and about once per 32 frames wherein a frame is about 10 milliseconds in response to the unlocking of the locked display.

In Example 28, the mobile communications device of Examples 15-27 may optionally include a processor including a memory, and a software application configured to be executed on said processor, wherein the context detection circuit is configured to interrogate the processor to detect an application execution state information, and wherein the context detection circuit is configured to derive at least one context information from the application execution state information.

In Example 29, the mobile communications device of Example 28 is disclosed wherein at least one of said task frequencies is adjusted responsive to said application execution state information.

In Example 30, the mobile communications device of Example 29 is disclosed wherein the software application requires a wireless data pipe.

In Example 31 the mobile communications device of Example 30 is disclosed wherein the task frequency adaptation circuit is configured to adjust at least one of said task frequencies downward in response to a change in the application execution state of the software application.

In Example 32, the mobile communications device of Example 31 is disclosed wherein the at least one of said task frequencies is adjusted upward in response to exchange of data across the wireless data pipe.

In Example 33, the mobile communications device of Example 31 is disclosed wherein the at least one of said task frequencies is a DRX task frequency.

In Example 34, the mobile communications device of Example 33 is disclosed wherein said DRX task frequency is adjusted to between about four times per frame and about once per 32 frames where a frame is about 10 milliseconds, in response to the activation of the software application.

In Example 35, the mobile communications device of Examples 33 and 34 is disclosed wherein said DRX task frequency is adjusted to between about four times per frame and about once per 32 frames where a frame is about 10 milliseconds in response to the exchange of data across the wireless data pipe.

In Example 36, the mobile communications device of Example 31 is disclosed wherein the at least one of said task frequencies is a CS&M task frequency.

In Example 37, the mobile communications device of Example 36 wherein said CS&M task frequency is adjusted to between about four times per frame and about once per 32 frames where a frame is about 10 milliseconds in response to activation of the software application.

In Example 38, the mobile communications device of Examples 36 and 37 is disclosed wherein said CS&M task frequency is adjusted to between about four times per frame and about once per 32 frames where a frame is about 10 milliseconds in response to the exchange of data across the wireless data pipe.

In Example 39, the mobile communications device of Example 28 is disclosed wherein said processor is configured to selectively enter one of a plurality of power states including at least one high power state and one low power state.

In Example 40, the mobile communications device of Example 39 is disclosed wherein the power states are controlled according to Advanced Configuration and Power Interface (ACPI) specifications.

In Example 41, the mobile communications device of Examples 39 and 40 is disclosed wherein at least one of said task frequencies is adjusted responsive to said power states.

In Example 42 the mobile communications device of Example 41 is disclosed wherein the power state is determined independently of the RRC circuit.

In Example 43, the mobile communications device of Example 41 is disclosed wherein the task frequency adaptation circuit adjusts at least one of said task frequencies downward in response to a change in power states.

In Example 44, the mobile communications device of Example 43 is disclosed wherein the task frequency adaptation circuit adjusts at least one of said task frequencies upward in response to a change in power states.

In Example 45, the mobile communications device of Example 44 is disclosed wherein the at least one of said task frequencies is a DRX task frequency.

In Example 46, the mobile communications device of Example 44 is disclosed wherein said DRX task frequency is adjusted to between about four times per frame and about once per 32 frames where a frame is about 10 milliseconds in response to entering the low power state from said high power state.

In Example 47, the mobile communications device of Examples 45 and 46 is disclosed wherein said DRX task frequency is adjusted to between about four times per frame and about once per 32 frames where a frame is about 10 milliseconds in response to entering the high power state from said low power state.

In Example 48, the mobile communications device of Example 44 is disclosed wherein the at least one of said task frequencies is a CS&M task frequency.

In Example 49 the mobile communications device of Example 48 is disclosed wherein said CS&M task frequency is adjusted to between about four times per frame and about once per 32 frames where a frame is about 10 milliseconds in response to entering the low power state from said high power state.

In Example 50, the mobile communications device of Examples 48 and 49 is disclosed wherein said CS&M task frequency is adjusted to between about four times per frame and about once per 32 frames where a frame is about 10 milliseconds in response to entering the high power state from said low power state.

In Example 51, the mobile communications device of Examples 28-50 is disclosed wherein the timer is configured to measure a delay, and where the task frequency adaptation circuit is configured to delay said adjustment according to the measured delay.

In Example 52, the mobile communications device of Example 5 may optionally include a second timer configured to measure a time period during which said mobile communications device is in one of said support modes.

In Example 53, the mobile communications device of Example 52 is disclosed wherein the second timer is configured to measure the time period in RRC idle mode.

In Example 54, the mobile communications device of Example 53 is disclosed wherein at least one of said task frequencies is adjusted responsive to the second timer.

In Example 55, the mobile communications device of Example 54 is disclosed wherein the task frequency adaptation circuit adjusts at least one of said task frequencies downward where the second timer exceeds a threshold.

In Example 56, the mobile communications device of Example 55 is disclosed wherein the threshold is between 1 microsecond and one or more minutes.

In Example 57, the mobile communications device of Examples 53-56 is disclosed wherein the at least one of said task frequencies is a DRX task frequency.

In Example 58, the mobile communications device of Example 57 is disclosed wherein said DRX task frequency is adjusted to between about four times per frame and about once per 32 frames where a frame is about 10 milliseconds in response to exceeding the threshold.

In Example 59, the mobile communications device of Example 53 is disclosed wherein the at least one of said task frequencies is a CS&M task frequency.

In Example 60, the mobile communications device of Example 59 is disclosed wherein the task frequency adaptation circuit adjusts the CS&M task frequency downward where the second timer exceeds a threshold.

In Example 61, the mobile communications device of Example 60 is disclosed wherein said CS&M task frequency is adjusted to between about four times per frame and about once per 32 frames where a frame is about 10 milliseconds in response to exceeding the threshold.

In Example 62, the mobile communications device of Example 28 is disclosed wherein operation on the mobile radio communication network is restricted during data connectivity to a virtual private network (VPN).

In Example 63, the mobile communications device of Example 62 is disclosed wherein at least one of said task frequencies is adjusted by the task frequency adaptation circuit responsive to said data connectivity.

In Example 64, the mobile communications device of Example 63 is disclosed wherein the task frequency adaptation circuit adjusts at least one of said task frequencies downward in response to connection to the VPN.

In Example 65, the mobile communications device of Example 64 is disclosed wherein the at least one of said task frequencies is adjusted upward in response to disconnection from the VPN.

In Example 66, the mobile communications device of Example 63 is disclosed wherein the at least one of said task frequencies is adjusted upward in the event that an emergency communication is required.

In Example 67, the mobile communications device of Examples 62-66 is disclosed wherein the at least one of said task frequencies is a DRX task frequency.

In Example 68, the mobile communications device of Example 67 is disclosed wherein said DRX task frequency is adjusted to between about four times per frame and about once per 32 frames where a frame is about 10 milliseconds in response to connection to the VPN.

In Example 69, the mobile communications device of Examples 67-68 is disclosed wherein said DRX task frequency is adjusted to between about four times per frame and about once per 32 frames where a frame is about 10 milliseconds in response to disconnection from the VPN.

In Example 70, the mobile communications device of Examples 62-66 is disclosed wherein the at least one of said task frequencies is a CS&M task frequency.

In Example 71, the mobile communications device of Example 70 is disclosed wherein said CS&M task frequency is adjusted to between about four times per frame and about once per 32 frames where a frame is about 10 milliseconds in response to connection to the VPN.

In Example 72, the mobile communications device of Examples 70 and 71 is disclosed wherein said CS&M task frequency is adjusted to between about four times per frame and about once per 32 frames where a frame is about 10 milliseconds in response to disconnection from the VPN.

In Example 73, and in accordance with FIGS. 1 and 2, a mobile communications device includes a modem controller, which may be a physical (PHY) layer modem controller, configured to receive context information comprising an adaptive scheduler circuit configured to schedule at least one task within at least one operational mode responsive to said context information, and a radio frequency (RF) transceiver configured to receive at least a portion of a task control information from the adaptive scheduler circuit.

In Example 74, the mobile communications device of Example 73 is disclosed wherein said context information is at least data related to one of the group including user event information, access point (AP) information, monitor state information, incoming wireless traffic information, and serving cell quality information.

In Example 75, the mobile communications device of Example 74 is disclosed wherein the incoming wireless traffic information is data related to at least one of the group including incoming call information, incoming message information and incoming emergency message information.

In Example 76, the mobile communications device of Example 75 is disclosed further comprising a PHY layer baseband processor connected to the RF transceiver, the baseband processor configured to receive at least a portion of the task control information from the adaptive scheduler circuit.

In Example 77, the mobile communications device of Examples 73-76 is disclosed wherein the task control information includes data related to one of reception control information and/or cell selection and measurement (CS&M) information.

In Example 78, the mobile communications device of Examples 73-77 may include an application processor configured to provide context information to the modem controller.

In Example 79, the mobile communications device of Example 78 is disclosed wherein the context information provided by the application processor includes data related to at least one of the group including display state information, application software state information, application processor power state information, activity time information, network connectivity information and event information.

In Example 80, the mobile communications device of Example 79 is disclosed further comprising a modem protocol stack processor connected between the application processor and the modem controller, the modem protocol stack processor configured to provide incoming wireless traffic information to the modem controller.

In Example 81, the mobile communications device of Example 80 is disclosed wherein the RF transceiver is configured to operate on a mobile radio communication network.

In Example 82, the mobile communications device of Example 81 is disclosed wherein the mobile radio communication network is a Long Term Evolution (LTE) network.

In Example 83, the mobile communications device of Example 82 is disclosed wherein the LTE network is a Long Term Evolution Advanced (LTE-A) network.

In Example 84, the mobile communications device of Examples 80-83 is disclosed wherein the at least one operational mode comprises an RRC idle mode.

In Example 85, the mobile communications device of Examples 81-84 is disclosed wherein said reception control information includes data related to discontinuous reception (DRX) of serving cell information from the mobile radio communication network.

In Example 86, the mobile communications device of Example 85 is disclosed wherein a task frequency associated with DRX is between four times per frame and once per 32 frames where a frame is 10 milliseconds.

In Example 87, the mobile communications device of Examples 85-86 is disclosed wherein the serving cell information is limited to one or more of the group including a paging channel, message and/or system information acquisition.

In Example 88, the mobile communications device of Examples 81-84 is disclosed wherein said at least one task includes search and measurement (CS&M) of neighbor cells of the mobile radio communication network.

In Example 89, the mobile communications device of Example 88 is disclosed wherein a task frequency associated with CS&M is between about four times per frame and about once per 32 frames where a frame is about 10 milliseconds.

In Example 90, the mobile communications device of Example 89 is disclosed wherein the task frequency associated with CS&M is at least partially based on a measurement of serving cell quality.

In Example 91, the mobile communications device of Example 90 is disclosed wherein the task frequency associated with CS&M is at least partially based on a threshold for serving sell quality.

In Example 92, the mobile communications device of Example 91 is disclosed wherein the threshold for serving cell quality is provided by the mobile radio communications network.

In Example 93, the mobile communications device of Examples 90-92 is disclosed wherein CS&M is configured for cell re-selection.

In Example 94, the mobile communications device of Example 84 is disclosed wherein said mode is triggered by a period of inactivity of the RF transceiver.

In Example 95, the mobile communications device of Example 73 can optionally include an output device for providing output data to a user environment, and an input device for receiving input data from a user environment, wherein the output and/or input data contains context information in the form of display state information.

In Example 96, the mobile communications device of Example 95 is disclosed wherein the adaptive scheduler circuit interrogates at least one of the input and/or output data to detect the display state information.

In Example 97, the mobile communications device of Example 96 is disclosed wherein at least one of said task control information is adjusted responsive to said display state information.

In Example 98, the mobile communications device of Example 97 is disclosed wherein the input/output device includes a lockable display.

In Example 99, the mobile communications device of Example 98 is disclosed wherein the adaptive scheduler circuit adjusts at least one of said task control information to reduce at least one task frequency associated with the RF transceiver downward in response to a locked display.

In Example 100, the mobile communications device of Example 99 is disclosed wherein the at least one of said task frequencies is adjusted upward in response to an unlocking of the locked display.

In Example 101, the mobile communications device of Example 100 is disclosed wherein the at least one of said task frequencies is a DRX task frequency.

In Example 102, the mobile communications device of Example 101 is disclosed wherein said DRX task frequency is adjusted to between about four times per frame and about once per 32 frames where a frame is about 10 milliseconds in response to the locked display.

In Example 103, the mobile communications device of Example 101 is disclosed wherein said DRX task frequency is adjusted to between about four times per frame and about once per 32 frames where a frame is about 10 milliseconds in response to the unlocking of the locked display.

In Example 104, the mobile communications device of Example 100 is disclosed wherein the at least one of said task frequencies is a CS&M task frequency.

In Example 105, the mobile communications device of Example 104 is disclosed wherein said CS&M task frequency is adjusted to between about four times per frame and about once per 32 frames where a frame is about 10 milliseconds in response to the locked display.

In Example 106, the mobile communications device of Example 105 wherein said CS&M task frequency is adjusted to between about four times per frame and about once per 32 frames where a frame is about 10 milliseconds in response to the unlocking of the locked display.

In Example 107, the mobile communications device of Examples 78-81 may optionally include a software application configured to be executed on said application processor, wherein the adaptive scheduler circuit is configured to interrogate the processor to detect an application execution state information, the adaptive scheduling circuit configured to derive at least one context information from the application execution state information.

In Example 108, the mobile communications device of Example 107 is disclosed wherein at least one of the task frequencies associated with said task control information is adjusted responsive to said application execution state information.

In Example 109, the mobile communications device of Example 108 is disclosed wherein the software application requires a wireless data pipe.

In Example 110, the mobile communications device of Example 109 is disclosed wherein the adaptive scheduler circuit adjusts at least one of said task frequencies downward in response to a change in the application execution state of the software application.

In Example 111, the mobile communications device of Example 110 is disclosed wherein the at least one of said task frequencies is adjusted upward in response to an exchange of data across the wireless data pipe.

In Example 112, the mobile communications device of Example 111 is disclosed wherein the at least one of said task frequencies is a DRX task frequency.

In Example 113, the mobile communications device of Example 112 is disclosed wherein said DRX task frequency is adjusted to between about four times per frame and about once per 32 frames where a frame is about 10 milliseconds in response to the activation of the software application.

In Example 114, the mobile communications device of Examples 112 and 113 is disclosed wherein said DRX task frequency is adjusted to between about four times per frame and about once per 32 frames where a frame is about 10 milliseconds in response to the exchange of data across the wireless data pipe.

In Example 115, the mobile communications device of Example 111 is disclosed wherein the at least one of said task frequencies is a CS&M task frequency.

In Example 116, the mobile communications device of Example 115 is disclosed wherein said CS&M task frequency is adjusted to between four times per frame and once per 32 frames where a frame is 10 milliseconds in response to activation of the software application.

In Example 117, the mobile communications device of Example 115 and 116 is disclosed wherein said CS&M task frequency is adjusted to between about four times per frame and about once per 32 frames where a frame is about 10 milliseconds in response to the exchange of data across the wireless data pipe.

In Example 118, the mobile communications device of Example 107 is disclosed wherein said processor is configured to selectively enter one of a plurality of power states including at least one high power state and one low power state.

In Example 119, the mobile communications device of Example 118 is disclosed wherein the power states are controlled according to Advanced Configuration and Power Interface (ACPI) specifications.

In Example 120, the mobile communications device of Example 118 and 119 is disclosed wherein at least one of said task frequencies is adjusted responsive to said power states.

In Example 121, the mobile communications device of Example 120 is disclosed wherein the power state is determined independently of the RRC circuit.

In Example 122, the mobile communications device of Example 120 is disclosed wherein the adaptive scheduler circuit adjusts at least one of said task frequencies downward in response to a change in power states.

In Example 123, the mobile communications device of Example 122 is disclosed wherein the adaptive scheduler circuit adjusts at least one of said task frequencies upward in response to a change in power states.

In Example 124, the mobile communications device of Example 123 is disclosed wherein the at least one of said task frequencies is a DRX task frequency.

In Example 125, the mobile communications device of Example 124 is disclosed wherein said DRX task frequency is adjusted to between about four times per frame and about once per 32 frames where a frame is about 10 milliseconds in response to entering the low power state from said high power state.

In Example 126, the mobile communications device of Examples 124 and 125 is disclosed wherein said DRX task frequency is adjusted to between about four times per frame and about once per 32 frames where a frame is about 10 milliseconds in response to entering the high power state from said low power state.

In Example 127, the mobile communications device of Example 123 is disclosed wherein the at least one of said task frequencies is a CS&M task frequency.

In Example 128, the mobile communications device of Example 127 is disclosed wherein said CS&M task frequency is adjusted to between about four times per frame and about once per 32 frames where a frame is about 10 milliseconds in response to entering the low power state from said high power state.

In Example 129, the mobile communications device of Examples 127 and 128 is disclosed wherein said CS&M task frequency is adjusted to between about four times per frame and about once per 32 frames where a frame is about 10 milliseconds in response to entering the high power state from said low power state.

In Example 130, the mobile communications device of Examples 107-129 is disclosed further comprising a timer configured to measure a delay, and where the task frequency adaptation circuit is configured to delay said adjustment according to the measured delay.

In Example 131, the mobile communications device of Example 130 may optionally include a second timer configured to measure a time period during which said mobile communications device is in one of said operational modes.

In Example 132, the mobile communications device of Example 131 is disclosed wherein the second timer is configured to measure the time period in RRC idle mode.

In Example 133, the mobile communications device of Example 132 is disclosed wherein at least one of said task frequencies is adjusted responsive to said second timer.

In Example 134, the mobile communications device of Example 133 is disclosed wherein the adaptive scheduler circuit adjusts at least one of said task frequencies downward where the second timer exceeds a threshold.

In Example 135, the mobile communications device of Example 134 is disclosed wherein the threshold is between 1 microsecond and one or more minutes.

In Example 136, the mobile communications device of Examples 132-135 is disclosed wherein the at least one of said task frequencies is a DRX task frequency.

In Example 137, the mobile communications device of Example 136 is disclosed wherein said DRX task frequency is adjusted to between about four times per frame and about once per 32 frames where a frame is about 10 milliseconds in response to exceeding the threshold.

In Example 138, the mobile communications device of Example 132 is disclosed wherein the at least one of said task frequencies is a CS&M task frequency.

In Example 139, the mobile communications device of Example 138 is disclosed wherein the task frequency adaptation circuit adjusts the CS&M task frequency downward where the second timer exceeds a threshold.

In example 140, the mobile communications device of Example 139 is disclosed wherein said CS&M task frequency is adjusted to between about four times per frame and about once per 32 frames where a frame is about 10 milliseconds in response to exceeding the threshold.

In Example 141, the mobile communications device of Example 107 is disclosed wherein operation on the mobile radio communication network is restricted during data connectivity to a virtual private network (VPN).

In Example 142, the mobile communications device of Example 141 is disclosed wherein at least one of said task frequencies is adjusted by the adaptive scheduler circuit responsive to said data connectivity.

In Example 143, the mobile communications device of Example 142 is disclosed wherein the adaptive scheduler circuit adjusts at least one of said task frequencies downward in response to connection to the VPN.

In Example 144, the mobile communications device of Example 143 is disclosed wherein the at least one of said task frequencies is adjusted upward in response to disconnection from the VPN.

In Example 145, the mobile communications device of Example 143 is disclosed wherein the at least one of said task frequencies is adjusted upward in the event that an emergency communication is required.

In Example 146, the mobile communications device of Examples 141-145 is disclosed wherein the at least one of said task frequencies is a DRX task frequency.

In Example 147, the mobile communications device of Example 146 is disclosed wherein said DRX task frequency is adjusted to between about four times per frame and about once per 32 frames where a frame is about 10 milliseconds in response to connection to the VPN.

In Example 148, the mobile communications device of Example 147 is disclosed wherein said DRX task frequency is adjusted to between about four times per frame and about once per 32 frames where a frame is about 10 milliseconds in response to disconnection from the VPN.

In Example 149, the mobile communications device of Examples 141-145 is disclosed wherein the at least one of said task frequencies is a CS&M task frequency.

In Example 150, the mobile communications device of Example 149 is disclosed wherein said CS&M task frequency is adjusted to between about four times per frame and about once per 32 frames where a frame is about 10 milliseconds in response to connection to the VPN.

In Example 151, the mobile communications device of Examples 149 and 150 is disclosed wherein said CS&M task frequency is adjusted to between about four times per frame and about once per 32 frames where a frame is about 10 milliseconds in response to disconnection from the VPN.

In Example 152, the mobile communications device of Example 151 is disclosed wherein the CS&M task frequency is the same as a CS&M task frequency associated with the RRC idle operational mode.

In Example 153, and in accordance with FIGS. 1 and 2, a method for operating a mobile communications device on a mobile radio network may include entering a support mode via a physical (PHY) layer modem controller of the mobile communications device, the support mode associated with at least one task, each of the at least one tasks having a support mode task frequency. The PHY layer modem controller is disclosed detecting the occurrence of at least one of a plurality of trigger events, determining whether the at least one detected trigger event is one of least a first type or a second type, controlling an RF transceiver of the mobile communications device, via an adaptive scheduler circuit within the PHY layer modem controller, to perform the at least one of the at least one tasks at a rest-state task frequency if the trigger event is of the first type.

In Example 154, the method of Example 153 is disclosed wherein the mobile communications device is configured to operate on a mobile radio communication network.

In Example 155, the method of Example 154 is disclosed wherein the mobile radio communication network is a Long Term Evolution (LTE) network.

In Example 156, the method of Example 155 is disclosed wherein the LTE network is a Long Term Evolution Advanced (LTE-A) network.

In Example 157, the method of Examples 153-156 is disclosed wherein the support mode is an RRC idle mode.

In Example 158, the method of Example 157 is disclosed wherein the rest-state task frequency is lower than the support mode task frequency.

In Example 159, the method of Examples 153-158 may optionally include controlling the RF transceiver, via the adaptive scheduler circuit to perform the at least one of the at least one tasks at a fast acquisition-state task frequency if the trigger event is of the second type.

In Example 160 the method of Example 159 is disclosed wherein the acquisition-state task frequency is higher than the rest state task frequency.

In Example 161 the method of Example 160 is disclosed wherein the acquisition-state task frequency is lower than the support mode task frequency.

In Example 162, the method of Examples 159-161 may optionally include controlling the RF transceiver, via the adaptive scheduler circuit to perform the at least one of the at least one tasks at the rest-state task frequency after a period of time at the fast acquisition state task frequency.

In Example 163, the method of Example 162 is disclosed wherein the period of time is defined by completion of a cell selection & measurement (CS&M).

In Example 164, the method of Example 162 is disclosed wherein the period of time is defined by a timer.

In Example 165, the method of Examples 159-161 optionally include controlling the RF transceiver, via the adaptive scheduler circuit, to perform the at least one of the at least one tasks at an alert-state task frequency.

In Example 166, the method of Example 165 may optionally include controlling the RF transceiver, via the adaptive scheduler circuit, to perform the at least one of the at least one tasks at one of the rest state task frequency or the fast acquisition state task frequency after a period of time.

In Example 167, the method of Example 165 may optionally include controlling the RF transceiver, via the adaptive scheduler circuit, to perform the at least one of the at least one tasks at the alert state task frequency until a second trigger event is detected.

In Example 168, the method of Example 167 is disclosed wherein the second trigger event is of the second type.

In Example 169, the method of Example 168 may optionally include controlling the RF transceiver, via the adaptive scheduler circuit, to perform the at least one of the at least one tasks at the rest state task frequency upon detection of the second trigger event.

In Example 170, the method of Examples 153-169 is disclosed wherein any one of the group including locking a display screen, a completion of cell reselection, connection to a virtual private network (VPN), a decrease in activity in a processor of the mobile communications device, a reduction in processor power state, an increase in serving cell quality, and reduction in access by an application to a wireless data pipe are defined as trigger events of the first type.

In Example 171, the method of Examples 153-170 is disclosed wherein any one of the group including unlocking a display screen, detection of an incoming wireless signal, detection of an incoming emergency message, an increase in application access to a wireless data pipe, a decrease in inactivity in a processor of the mobile communications device, a reduction in a power state of the processor, a decrease in serving cell quality and disconnection from a virtual private network (VPN) are defined as trigger events of the second type.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A mobile communications device comprising:
a wireless transceiver,
a controller circuit connected to the transceiver, and
a task frequency adaptation circuit configured to adapt the task frequency of at least one task from a first task frequency to a second task frequency, responsive to detecting a task trigger;
wherein the task comprises discontinuous reception or cell search and measurement and wherein the task trigger comprises a connection to a virtual private network.

2. The mobile communications device of claim 1, wherein the wireless transceiver is configured to operate in a mobile radio communication network.

3. The mobile communications device of claim 2, wherein the mobile radio communication network is a Long Term Evolution (LTE) network.

4. The mobile communications device of claim 3, wherein said at least one task includes discontinuous reception (DRX) of serving cell information from a serving cell within the mobile radio communication network.

5. The mobile communications device of claim 4 wherein the serving cell information is limited to one or more of the group including a paging channel, message, system information acquisition or a combination thereof.

6. The mobile communications device of claim 1, further comprising a mode selector configured to transition among a plurality of support modes in response to at least one mode trigger, each of the plurality of support modes corresponding to a frequency of the task, and wherein the at least one mode trigger comprises a display unlock, activation of application software requiring wireless data, detection of an incoming call, or a failed paging reception.

7. A method for operating a mobile communications device on a mobile radio network, comprising:
entering a support mode via a physical (PHY) layer modem controller of the mobile communications device, the support mode associated with at least one task, each of the at least one tasks having a support mode task frequency, where the task frequency is the schedule in which a task is performed, the PHY layer modem controller:
detecting the occurrence of at least one of a plurality of task triggers,
determining whether the at least one detected task trigger is one of least a first type or a second type,
controlling an RF transceiver of the mobile communications device, via an adaptive scheduler circuit within the PHY layer modem controller, to perform the at least one of the at least one tasks at a rest-state task frequency if the trigger event is of the first type;
wherein the at least one of a plurality of task triggers comprises a connection to a virtual private network.

8. The method of claim 7 wherein the mobile communications device is configured to operate on a mobile radio communication network.

9. The method of claim 7 wherein the mobile radio communication network is a Long Term Evolution (LTE) network.

* * * * *